Aug. 24, 1965 K. SENNEWALD ETAL 3,201,918
PROCESS FOR SEPARATING ACRYLONITRILE AND AMMONIA
FROM GASEOUS MIXTURES
Filed Aug. 8, 1961
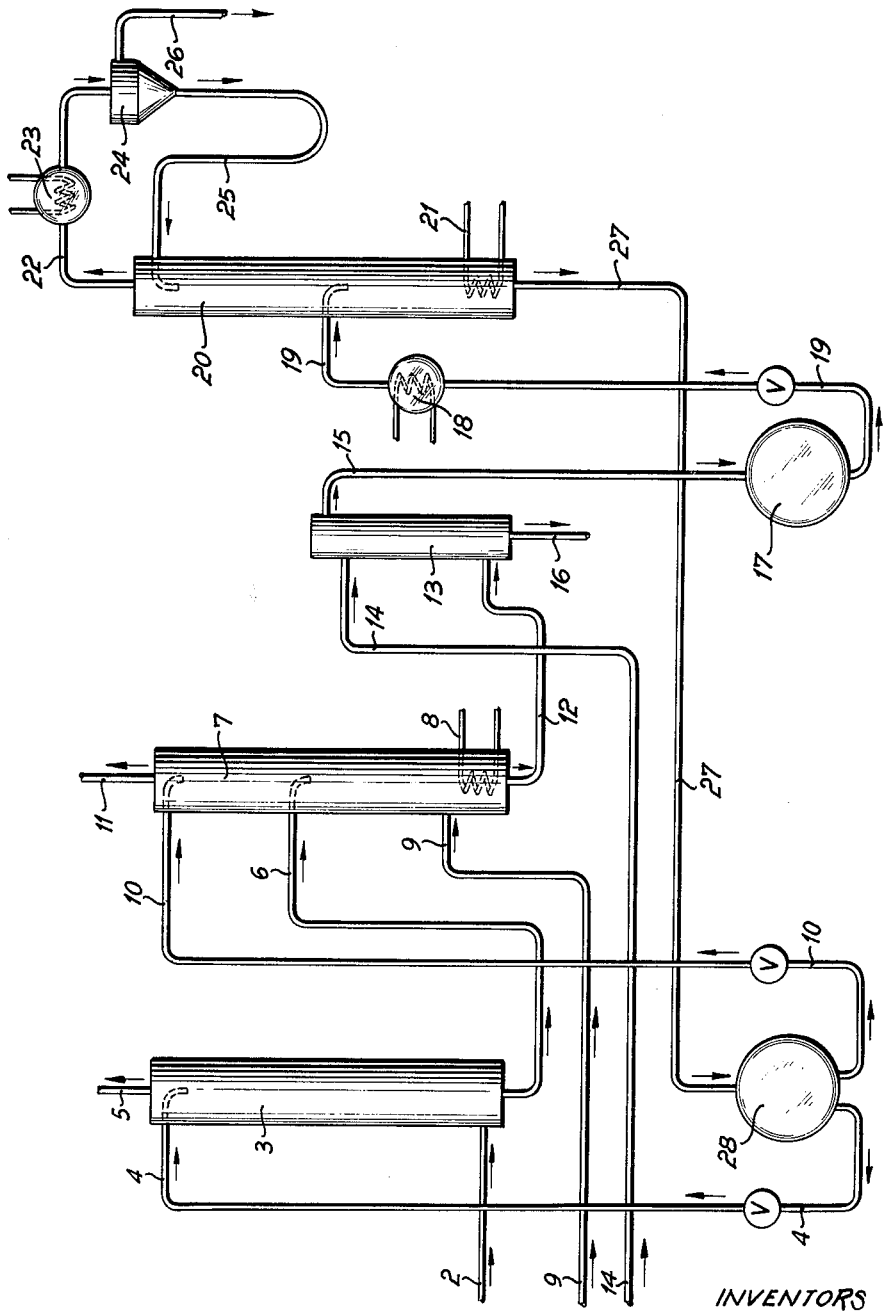
INVENTORS
Kurt Sennewald
Wilhelm Vogt
Joachim Kandler
BY
Connolly and Hutz
ATTORNEYS

3,201,918
PROCESS FOR SEPARATING ACRYLONITRILE AND AMMONIA FROM GASEOUS MIXTURES
Kurt Sennewald, Wilhelm Vogt, and Joachim Kandler, all of Knapsack, near Cologne, Germany, assignors to Knapsack - Griesheim Aktiengesellschaft, Knapsack, near Cologne, Germany, a corporation of Germany
Filed Aug. 8, 1961, Ser. No. 130,146
Claims priority, application Germany, Aug. 12, 1960, K 41,450
9 Claims. (Cl. 55—38)

The present invention relates to a process for separating acrylonitrile and ammonia from gaseous mixtures by washing out the latter. The specification furthermore describes a device for carrying out the process of the invention.

In the known processes for working up gaseous mixtures containing ammonia and acrylonitrile the gas is freed from ammonia by means of an acid washing liquid, for example an aqueous mineral acid. It is necessary to neutralize the ammonia, i.e. to use acid washing liquids, since free ammonia reacts in polar solvents, such as water or alcohol, with acrylonitrile with the formation of the corresponding primary, secondary and tertiary amines.

In case the neutralization wash is simultaneously an absorption wash for acrylonitrile, which can be readily achieved by appropriately diluting the acid aqueous liquids used, ammonia and acrylonitrile can be separated from the gas mixture in one operation. The acrylonitrile can then be obtained by distilling the washing liquid.

This usual working method has the great disadvantage that the ammonia is chemically bound. It can then be used in the form obtained, for example as ammonium sulfate. If, however, free ammonia is to be recovered this involves further operations, the formation of by-products and considerable expenses.

The process of the present invention avoids the aforementioned difficulties and enables acrylonitrile to be separated from gaseous mixtures containing ammonia without neutralizing the ammonia. The ammonia is maintained in the free state, ready for further use.

In the process of the present invention the gas mixture containing acrylonitrile and ammonia is washed with a washing liquid which dissolves the acrylonitrile but which absorbs only minor amounts of ammonia. In has been found that hydrocarbons and hydrocarbon mixtures, for example especially aromatic hydrocarbons and hydrocarbon mixtures, aromatic ethers, esters and hydrocarbons with hydrocarbons are suitable washing liquids. Besides, other non-polar or slightly polar liquids can be used, that is to say liquids which have a low dipole moment and a low dielectric constant. Especially suitable are liquids having a dipole moment $\mu \leqq 2.5$ Debye and a dielectric constant $\epsilon \leqq 10$. It is particularly advantageous to use liquids having a dipole moment $\mu \leqq 1.2$ Debye and a dielectric constant $\epsilon \leqq 5$. In liquids of this type ammonia and acrylonitrile do not react with one another at the temperatures and the times of stay required in the process.

Especially suitable are liquids the solubility coefficients according to Bunsen of which are sufficiently different for acrylonitrile and ammonia and which facilitate the separation of the two substances. Still further, it is of advantage to use a washing liquid the boiling point or boiling range of which is sufficiently remote from the boiling point of acrylonitrile, so that the acrylonitrile can be readily recovered from the washing liquid by distillation.

Although in the process of the invention any non-polar or slightly polar liquid can be used, it is particularly indicated to employ liquids the absorption power and boiling range of which facilitate the separation and recovery of acrylonitrile. Liquids of this type are, for example benzene homologues or mixtures thereof or aliphatic or cycloaliphatic hydrocarbons having a chain length of about 8 to 16 atoms.

In the process of the invention there are especially suitable for use aromatic or alkylated aromatic hydrocarbons, such as diphenyl, xylenes, trimethylbenzenes, cumene, p-cymene, tetraline, methylnaphthalenes, for example α-methylnaphthalene; ethylnaphthalenes, for example α-ethylnaphthalene; and analogous alkylated benzenes and naphthalenes and mixtures of the aforesaid substances. Still further, there can be used with advantage aromatic ethers, such as anisol or diphenyl oxide. The latter may also be employed in the form of its eutectic mixture with diphenyl. The ratio of the coefficients of solubility according to Bunsen for acrylonitrile:ammonia ranges from about 40 to 1 to 200 to 1 when the aforementioned solvents are used. The coefficient of solubility according to Bunsen for ammonia at 20° C. is about 5 to 8 with the use of the mentioned aromatic hydrocarbons and about 2 to 3 with the use of the aliphatic and cycloaliphatic hydrocarbons, while the coefficient of solubility according to Bunsen for acrylonitrile with the use of the aromatic hydrocarbons is about 400 to 800 and with the use of the aliphatic and cycloaliphatic hydrocarbons about 100 to 200. It is of advantage to operate with a ratio of the coefficients of solubility according to Bunsen for acrylonitrile to ammonia of at least about 10 to 1.

The washing liquid used in the process of the invention shall have a boiling point as high as possible so that the losses of solvent, owing to the partial pressure, are low. The eutectic mixture of diphenyl and diphenyl oxide is very suitable (26.5% by weight of diphenyl and 73.5% by weight of diphenyl oxide) since it has a boiling point of 256° C. A mixture of the three trimethylbenzenes is also highly satisfactory.

The amounts of solvent entrained, owing to the partial pressure, by the gas leaving the washing or desorption column, can be removed from the gas and recovered by known methods, for example by adsorbing the solvent on active carbon or by means of a wash with heavy oil.

It is suitable to use a washing liquid which is liquid at room temperature or at a temperature slightly above 20° C., since the absorption in the washing column should take place at as low a temperature as possible in order to attain, on the one hand, as high as possible a concentration of acrylonitrile in the washing liquid and, on the other hand, to avoid with certainty the reaction between ammonia and acrylonitrile. Higher melting compounds can be used in the form of mixtures, for example the eutectic mixture of diphenyl and diphenyl oxide melting at +12.3° C.

After the absorption of acrylonitrile in one of the washing liquids to be used in the process of the invention the ammonia may be removed from the gas in known manner, for example by a water wash.

The process of the invention is especially applicable when in a chemical reaction acrylonitrile and ammonia together leave a reaction vessel as is the case, for example, in processes in which acrylonitrile is manufactured in the gaseous phase from hydrocarbons, such as propylene, and ammonia, if desired in the presence of air or oxygen (cf. U.S. application serial No. 77,030 now U.S. Patent 3,135,783).

In processes of this kind it may be advantageous not to react the hydrocarbon completely to acrylonitrile, so that in addition to acrylonitrile formed unreacted ammonia and hydrocarbon leave the reaction vessel. The acrylonitrile can then be separated by the process of the invention and the residual gas containing ammonia can be continuously recycled into the reaction vessel for being further reacted.

The washing out of the acrylonitrile, the desorption of the dissolved ammonia and the subsequent distillation of the washing liquid containing acrylonitrile are carried out in known manner. It is novel, however, to use the known gas-separating units for working up a gas mixture containing acrylonitrile and ammonia.

When the gas mixture contains further constituents which dissolve wholly or partially in the washing liquid, these substances can be separated wholly or partially with the acrylonitrile. By suitable measures, such as appropriate selection of the amount of washing liquid, subsequent desorption or boiling out, these substances can be wholly retained in the residual gas or quantitatively dissolved with the acrylonitrile. Gas mixtures of this kind are formed in processes in which acrylonitrile is made from ammonia, propylene and air or oxygen in the gaseous phase. These gas mixtures substantially contain as further reaction products acetonitrile and hydrocyanic acid. The acetonitrile can be separated together with the acrylonitrile and the hydrocyanic acid can remain in the residual gas together with the ammonia. The simultaneous separation of acetonitrile and acrylonitrile with the washing liquids mentioned above is a further feature of the process of the invention.

Other constituents of the gas can be removed in analogous manner. The composition of the gas is not critical in the process of the invention, provided that the individual gas constituents do not react with acrylonitrile and ammonia under the process conditions.

The process of the invention can be carried out in an apparatus as diagrammatically represented by way of example in the accompanying drawing and according to the following flow scheme, but it is not limited thereto.

The starting gas mixture, which contains acrylonitrile and ammonia, enters wash tower 3 at the bottom via conduit 2. The wash tower is charged at the head with the washing liquid through conduit 4. The residual off gas which has been freed from acrylonitrile escapes via head outlet 5, while the washing liquid charged with acrylonitrile and a small amount of ammonia is withdrawn at the bottom of wash tower 3 and conducted via conduit 6 to desorption column 7 the sump of which can be heated at 8 for promoting the expulsion of dissolved portions of ammonia. An inert expelling gas is introduced into the sump of column 7 through conduit 9 and discharged through head outlet 11. Simultaneously, fresh washing liquid is supplied at the head of column 7 through conduit 10, for taking up desorbed parts of acrylonitrile. At the bottom of column 7 the washing liquid which is free or substantially free from ammonia is withdrawn through bottom outlet 12 and conducted through column 13, fed with dilute sulfuric acid, via conduit 14, and conduit 15 into a reservoir 17 from where it is passed via conduit 19 and preheater 18 into distilling column 20. Column 13 in which last traces of ammonia can be removed is provided with a bottom outlet 16. If desired, the acid wash in column 13 can be dispensed with and the washing liquid which contains the acrylonitrile can be conducted from desorption column 7 directly to reservoir 17 or via preheater 18 into distilling column 20, the sump of which is heated by heating 21. The acrylonitrile is withdrawn at the head of column 20 via head outlet 22, cooler 23, separator 24, reflux conduit 25 and take off line 26. The washing liquid travels from the sump via bottom outlet 27 into reservoir 28 from which it is recycled via conduits 4 and 10 into the head of wash tower 3 and desorption column 7.

In general a level control in the sump of the washing tower 3 need not be realized for keeping low the residence time. The same applies to the desorption column 7 in case the sump thereof must not be heated by heater 8.

More particularly, the process for separating acrylonitrile and ammonia from gaseous mixtures in accordance with the invention consists in using as washing liquids, which absorb specifically acrylonitrile, unpolar or slightly polar liquids having a dipole moment $\mu \leqq 2.5$ Debye and a dielectric constant $\epsilon \leqq 10$, a ratio of the solubility coefficients according to Bunsen for acrylonitrile to ammonia of at least about 10:1 and a boiling point or range that is sufficiently remote from the boiling point of acrylonitrile for the distillative separation with the simultaneous avoidance of the formation of azeotropic mixtures. In other words: (1) the wash liquids to be used should have a boiling range sufficiently reomte from the boiling point of acrylonitrile so that the latter can readily be removed therefrom by distillation, and that (2) the wash liquids specified under item (1) can only be used with the *further* proviso that they do not form azeotropic mixtures with the acrylonitrile. Especially suitable are liqiuds having a dipole moment $\mu \leqq 1.2$ Debye and a dielectric constant $\epsilon \leqq 5$ and a ratio of the solubility coefficients according to Bunsen at about 20° C. for acrylonitrile to ammonia of at least about 40:1.

In the process of the invention there are used as washing liquids liquids or liquid mixtures which are liquid at room temperature or at temperatures slightly above 20° C., which liquids simultaneously have as high a boiling point as possible. Especially suitable are benzene and naphthalene homologues or mixtures thereof boiling in the range from about 110° C. to 280° C., such as alkylated benzenes and naphthalenes, for example trimethyl benzenes, xylenes, toluene, cumene, p-cymene, diphenyl, tetraline, α-methyl- or α-ethyl-naphthalenes or mixtures of these substances. Moreover, it is possible to use aliphatic or cycloaliphatic hydrocarbons or mixtures thereof having a chain length of about 8 to 16 carbon atoms, and preferably about 10 to 12 carbon atoms, such as paraffinic hydrocarbons, decaline or the like and mixtures thereof. Still further there can be employed aromatic ethers or mixtures thereof, such as for example, anisol or diphenyl oxide or the like. Particularly suitable is a mixture of diphenyl and diphenyl oxide, preferably in eutectic composition.

By the process of the invention gas mixtures can be washed out which contain up to about 20% by volume of acrylonitrile and up to about 50% by volume of ammonia, the remainder being, for example, air, oxygen, gaseous hydrocarbons, hydrocyanic acid, acetonitrile, carbon dioxide, or carbon monoxide or the like. The process of the invention can, however, also be used for washing out gas mixtures of any other composition outside the above range for example for separating acrylonitrile from practically pure ammonia.

According to a further feature of the invention the starting gas mixture is conducted to a first stage wherein it is scrubbed countercurrently with the washing liquid. At the head of the first stage the residual gas containing ammonia is withdrawn and at the bottom the acrylonitrile-containing washing liquid is discharged. The washing liquid is introduced into a second stage approximately at the center and the residual ammonia is expelled by means of a gas supplied near the bottom. The expelling gas is withdrawn at the head of the second stage and simultaneously further washing liquid is supplied. The total amount of washing liquid containing the acrylonitrile is discharged at the bottom, and after having been preheated, if necessary, it is conducted to the third heated stage approximately at the center for the distillative separation of the acrylonitrile which is withdrawn at the head, while the washing liquid is drawn off from the sump and recycled to the first and second stage at the head. The washing liquid fed at the head of the first and the second stages has a temperature of about 5 to 30° C., for example 20° C. The sump of the second stage for the desorption is heated at about 30–50° C. When using appropriate amounts of inert gas a heating can be dispensed with. For expelling the residual ammonia in the second stage inert gases can be used, such as air, nitrogen, carbon dioxide, gaseous hydrocarbons, for example propylene or the like. The sump of the third distillation stage is heated at about 110° C.–280° C., i.e. the boiling temperature of the washing liquid used, and the acrylonitrile-containing washing liquid is preheated to a temperature of about 80–150° C. A column filled with about 2 N sulfuric acid can be intercalated between the desorption stage and the distilling stage. The time of stay of the washing liquid in the washing stage and the desorption stage is about 2 to 30 minutes each time.

The amounts of washing liquid entrained by the gas leaving the washing and the desorption stage at the head can be recovered in known manner, for example by adsorbing them on active carbon or by a wash with heavy oil.

According to another feature of the invention the reaction gas mixture obtained in the manufacture of acrylonitrile from propylene, ammonia and air or oxygen is used as starting gas for this washing process of the invention; the acetonitrile obtained as by-product is separated with the acrylonitrile and the hydrocyanic acid of the reaction gas remains in the residual gas together with the ammonia in excess.

It is likewise possible to combine wash tower 3 with desorption column 7 by mounting the former on the latter. The upper parts of the combined column then functions as wash tower 3 while the lower part acts as desorption column 7. When operating in this manner a higher amount of washing liquid must be supplied at the head of the column than introduced at the head of wash tower 3 via conduit 4. However, conduit 10 for conducting additional washing liquid into column 7 can be dispensed with. The expelling gas introduced via conduit 9 into the lower part of the combined column escapes at the head of said column together with the residual gas hitherto leaving at the head of wash tower 3 through conduit 5, while the starting gas mixture is supplied approximately at the center of the combined column. Consequently, according to this further feature of the invention the washing stage and the desorption stage are combined in one stage in a manner such that the washing stage is situated above the desorption stage. The total amount of the washing liquid is supplied at the head and the starting gas mixture is introduced into the column at the center. The expelling gas introduced into the lower part of the combined stage streams off at the head together with the residual gas freed from acrylonitrile and containing ammonia. The following examples serve to illustrate the invention, but they are not intended to limit it thereto, the percentages being by volume unless otherwise stated.

*Example 1*

As washing liquid an aromatic oil was used which consisted essentially of a mixture of trimethyl-benzenes having a boiling range of about 164–186° C., a medium molecular weight of 122 and a density of 0.902 at 20° C. 0.7 C.B.M./hr. of a gas composed of 1.5% by volume of acrylonitrile, 10% by volume of ammonia and 88.5% by volume of air was introduced at the bottom of washing column 3. 2.8 liters/hr. of the above washing liquid were supplied at the head of washing column 3 at a temperature of 20° C. The charged washing liquid was conducted to desorption column 7 into which 25 liters/hr. of air were introduced as expelling gas through conduit 9. At the head of column 7 0.1 liter of fresh washing liquid was supplied. In this case the liquid, without being heated in the sump at 8, passed through column 13 filled with 2 N-sulfuric acid into collector 17, where it was preheated before it was conducted via conduit 19 into distilling column 20.

The gases leaving at the head of washing column 3 and desorption column 7 were free from acrylonitrile. The washing liquid discharged from washing column 3 at the bottom contained 0.325 g. NH$_3$/liter while the washing liquid withdrawn at the bottom of column 7 contained only about 0.010 g. NH$_3$/liter, i.e. about 3% of the originally dissolved ammonia and about 0.06% of the ammonia contained in the starting gas.

The time of stay of the washing liquid in the washing column 3 and the desorption column 7 was about 6–8 minutes each time.

At the head of distilling column 20 about 23.5 grams of acrylonitrile were withdrawn per hour, having a degree of purity of about 98.5%. This amount is practically quantitatively the amount contained in the starting gas.

*Example 2*

The process was carried out as described in Example 1 with the exception that the amount of expelling gas introduced into desorption column 7 was increased to 50 liters/hr. and the amount of washing liquid supplied at the head of said column was raised to 0.2 liter/hr. The washing liquid leaving the sump of column 7 contained only 0.00116 gram NH$_3$/liter, that is to say less than 0.4% of the originally dissolved ammonia. The molar ratio of acrylonitrile to ammonia in the washing liquid leaving column 7 at the bottom was, therefore, about $2.3 \times 10^3:1$. In this case the column 13 was dispensed with and the washing liquid charged with acrylonitrile was directly introduced into distilling column 20.

*Example 3*

Decaline was used as washing liquid. A gas as defined in Example 1 was introduced into washing column 3 and washed at 20° C. with 6.0 liters/hr. of washing liquid. The ammonia was desorbed in column 7 with 30 liters/hr. of nitrogen and washed with 0.3 liter/hr. of fresh washing liquid. The time of stay of the washing liquid in washing column 3 and desorption column 7 was 3–4 minutes each time. At the head of distilling column 20, 23.5 grams of acrylonitrile of 99.0% strength were obtained.

*Example 4*

The eutectic mixture of diphenyl and diphenyl oxide was used as washing liquid. 1.3 C.B.M./hr. of a gas composed of 4.5% by volume of acrylonitrile, 5.5% by volume of ammonia, 1.2% by volume of steam and 88.8% by volume of air were introduced into washing column 3. At the head of washing column 3 3.0 liters/hr. of the aforementioned washing liquid were supplied at 20° C. The charged washing liquid was passed into desorption column 7 which was fed via conduit 9 with 55 liters/hr. of nitrogen. The sump of desorption column 7 was heated at 40° C. At the head of column 7, 0.15 liter/hr. of fresh washing liquid was introduced. The residence time of the washing liquid in columns 3 and 7 was approximately the same as in Example 1. The washing liquid was passed from column 7, while avoiding column 13, and as described in Example 2, into distilling column 20 via collector 17 and preheater 18 where it had been heated to about 150° C. The sump of the distilling column was heated at about 270° C.

As head product of the distilling column 20 about 128 grams/hr. of acrylonitrile having a degree of purity of 99.9% were obtained.

*Example 5*

The washing liquid described in Example 1 was used. A gas was introduced into washing column 3 which came from a reaction vessel in which propylene, ammonia and air had been reacted for the manufacture of acrylonitrile. The off gas had the following composition:

5.2% of acrylonitrile
0.7% of acetonitrile
1.5% of hydrocyanic acid
3.0% of oxygen
4.8% of propylene
2.8% of carbon dioxide
0.6% of carbon monoxide
5.2% of ammonia
75.7% of nitrogen, and traces of aldehydes, other nitriles and hydrocarbons.

1.25 C.B.M./hr. of said gas were introduced into washing column 3 and scrubbed at 20° C. with 4.8 liters/hr. of washing liquid. In column 7 the washing liquid was stripped with 130 liters/hr. of nitrogen and the off gas washed with 0.55 liter/hr. of fresh washing liquid. The sump of desorption column 7 was heated at about 40° C. The residence times of the washing liquid in the washing column 3 and the desorption column 7 were about 4–5 minutes each time. The washing liquid charged with acrylonitrile and acetonitrile was passed from column 7 via column 13 and collector 17 into distilling column 20, the sump of which was maintained at about 175° C. At the head of distilling column 20, 158.7 grams of a product were discharged which was composed of:

90.0% of acrylonitrile
9.4% of acetonitrile
0.2% of propylene
0.1% of hydrocyanic acid
0.1% of propionitrile
0.05% of aldehydes, traces of carbon dioxide, and other hydrocarbons.

The acrylonitrile and acetonitrile were separated from the above product in known manner, for example by extractive distillation.

We claim:

1. A process for separating acrylonitrile and ammonia from gaseous mixtures which comprises conducting a gaseous mixture into a first stage where it is scrubbed countercurrently with a washing liquid thereby obtaining an ammonia containing residual gas and an acrylonitrile and residual ammonia containing washing liquid, withdrawing the ammonia-containing residual gas at the head of said stage, discharging the acrylonitrile and residual ammonia-containing washing liquid at the bottom of said stage, conducting it into a second stage approximately at its center where residual ammonia is desorbed by means of an expelling gas introduced near the bottom of said second stage, removing the desorption gas at the head of the second stage, supplying additional washing liquid at the head of the second stage, withdrawing the total amount of washing liquid containing the acrylonitrile at the bottom of said second stage, introducing said washing liquid containing the acrylonitrile approximately at the center into a third and heated stage, distilling said liquid to separate the acrylonitrile, discharging said acrylonitrile at the head of said third stage, withdrawing the washing liquid from the sump of the third stage, recycling it into the first and second stage at the head thereof, the washing liquid absorbing the acrylonitrile being a member selected from the group consisting of trimethylbenzenes, xylenes, toluene, cumene, p-cymene, diphenyl, tetraline, decaline, α-methylnaphthalenes, α-ethyl-naphthalenes, anisol, diphenyl oxide, and mixtures thereof.

2. The process of claim 1 wherein the eutectic mixture of diphenyl and diphenyl oxide is used as washing liquid.

3. The process of claim 1 wherein a gaseous mixture is used which contains up to about 20% by volume of acrylonitrile and up to about 50% by volume of ammonia.

4. The process of claim 3, wherein the remainder of the gaseous mixture constitutes at least one susbtance selected from the group consisting of oxygen, gaseous hydrocarbons, hydrocyanic acid, acetonitrile, carbon dioxide and carbon monoxide.

5. The process of claim 1, wherein the expelling gas is selected from the group consisting of nitrogen, carbon dioxide and a gaseous hydrocarbon.

6. The process of claim 1, wherein propylene is used as the expelling gas.

7. The process of claim 1, wherein the sump of the third stage is heated at about 110° to 280° C. and the total amount of washing liquid containing the acrylonitrile is preheated to about 80° to 150° C. before it is conducted to the third stage.

8. The process of claim 1, wherein a column filled with about 2 N-sulfuric acid is intercalated between the second and the third stage for passing the total amount of washing liquid therethrough for removing last traces of ammonia from the washing liquid.

9. The process of claim 1, wherein the gaseous mixture results from the manufacture of acrylonitrile from propylene, ammonia and oxygen, acetonitrile being formed as a by-product and separated together with the acrylonitrile, and hydrocyanic acid being formed as a by-product and being separated with the ammonia-containing residual gas.

References Cited by the Examiner

UNITED STATES PATENTS

| | | | |
|---|---|---|---|
| 2,450,642 | 10/48 | Denton et al. | 260—465.3 |
| 2,500,291 | 3/50 | Liebel et al. | 55—70 |
| 2,526,676 | 10/50 | Lovett | 260—465.3 |
| 2,621,204 | 12/52 | Mac Lean et al. | 260—465.3 |
| 2,702,300 | 2/55 | Keller et al. | 260—465.3 |
| 2,726,734 | 12/55 | Nirenberg | 55—65 |
| 2,834,431 | 5/58 | Fauser | 55—68 |
| 2,987,451 | 6/61 | Sennewald et al. | 260—465.3 X |
| 3,026,969 | 3/62 | Braconier et al. | 55—68 X |

FOREIGN PATENTS

| | | |
|---|---|---|
| 201,119 | 8/23 | Great Britain. |
| 708,968 | 5/54 | Great Britain. |

REUBEN FRIEDMAN, *Primary Examiner.*

GEORGE D. MITCHELL, HERBERT L. MARTIN,
*Examiners.*